United States Patent
Atsumi et al.

[11] Patent Number: 6,120,938
[45] Date of Patent: Sep. 19, 2000

[54] NON-AQUEOUS ELECTROLYTE SECONDARY CELL

[75] Inventors: Yoshinori Atsumi; Masayuki Nagamine, both of Fukushima, Japan

[73] Assignee: Sony Corporation, Tokyo, Japan

[21] Appl. No.: 09/254,838

[22] PCT Filed: Jul. 15, 1998

[86] PCT No.: PCT/JP98/03185

§ 371 Date: Jul. 1, 1999

§ 102(e) Date: Jul. 1, 1999

[87] PCT Pub. No.: WO99/04442

PCT Pub. Date: Jan. 28, 1999

[30] Foreign Application Priority Data

Jul. 15, 1997 [JP] Japan .................... 9-190176

[51] Int. Cl.⁷ .................................................. H01M 4/48
[52] U.S. Cl. .................................... 429/231.1; 429/231.5
[58] Field of Search ........................... 429/231.1, 231.5

[56] References Cited

U.S. PATENT DOCUMENTS 5,464,708  11/1995  Neat et al. ................. 429/218
5,545,468   8/1996  Koshiba et al. ............. 429/218
5,766,796   6/1998  Abraham et al. ............ 429/192

FOREIGN PATENT DOCUMENTS

| 6-68867 | 3/1994 | Japan . |
|---|---|---|
| 7-14581 | 1/1995 | Japan . |
| 7-85878 | 3/1995 | Japan . |
| 7-288124 | 10/1995 | Japan . |
| 8-180875 | 7/1996 | Japan . |
| 8-264179 | 10/1996 | Japan . |
| 10-27626 | 1/1998 | Japan . |

OTHER PUBLICATIONS

Sasaki et al., "Preparation and Acid–Base Properties of a Protonated Titanate . . . ", Chem. Mater. vol. 7, No. 5, pp. 1001–1007. (no month), 1995.

*Primary Examiner*—Carol Chaney
*Attorney, Agent, or Firm*—Hill & Simpson

[57] ABSTRACT

A non-aqueous electrolyte secondary battery is disclosed in which hydrogen lithium titanate prepared by an acid process of lithium titanate and having pH of 11.2 or smaller or hydrogen lithium titanate expressed by general formula $H_xLi_{y-x}Ti_zO_4$ (where $y \geq x > 0$, $0.8 \leq y \leq 2.7$ and $1.3 \leq z \leq 2.2$) is employed as an active material for an electrode. Hydrogen lithium titanate may be employed as an active material for a positive electrode or a negative electrode. Thus, a charging capacity greater than a theoretical capacity is realized. It is preferable that hydrogen lithium titanate is formed into a particle shape and includes voids in the particles. It is preferable that the largest particle size is 0.1 μm to 50 μm and the specific surface area is 0.01 m²/g to 300 m²/g.

30 Claims, 2 Drawing Sheets

NON-AQUEOUS ELECTROLYTE SECONDARY CELL

FIELD OF THE INVENTION

The present invention generally relates to a non-aqueous electrolyte secondary battery and more specifically, to a non-aqueous electrolyte secondary battery containing hydrogen lithium titanate prepared by substituting protons for a portion of lithium thereof as an active material.

BACKGROUND OF THE INVENTION

In recent years, the advance of electronic technology has realized an improvement in the performance, size reduction and portable structures of a variety of electronic apparatuses. Also secondary batteries for use as the power sources for the electronic apparatuses must have high performance and reduced sizes.

As a new secondary battery which is capable of satisfying the foregoing requirements, a non-aqueous electrolyte secondary battery is expected to be employed. In particular, lithium-ion secondary batteries, which are able to occlude and discharge lithium-ion, have energetically been developed and put into practical use.

A positive-electrode active material for the foregoing battery has mainly been any one of vanadium pentoxide, manganese oxide, lithium cobalt acid, lithium nickel acid and spinel type lithium manganese. The negative electrode is made of a carbon material, such as graphite. Thus, a high-tension and high-energy-density battery has been put into practical use.

A battery of the type made of the above-mentioned materials, however, is unfit for use in a low voltage region not higher than 3 V.

It can be considered that reduction in the voltage required for each of the apparatuses will furthermore be attempted because of the advancement of the technology for developing the electronic apparatuses and reduction in the voltage required to operate ICs.

Under the foregoing circumstances, a battery incorporating a negative electrode containing spinel type lithium titanate has been combined with a solar generator so as to be put into practical use as a power source for a watch, which is operated at a voltage of about 1.5 V. The future trend of the above-mentioned combination in the market has received attention (see, to "Lithium-Ion Titanate Secondary Battery" Document No. N03–04, New Material, August 1996).

The above-mentioned battery system has an excellent cycle characteristic, over discharge resistance and a preservation characteristic. It can be considered that requirements for development of batteries having larger charging/discharging capacities will be imposed if 1.5 V batteries will be used more widely.

Hitherto, the characteristics of titanium oxide, which is a raw material of lithium titanate for forming a positive electrode and serving as an active material in a negative electrode of a non-aqueous electrolyte secondary battery, exert a considerable influence on the characteristics of the battery. Therefore, research and development have energetically been reported.

Titanium oxide, which is the raw material, occurs in the form of bluechite, rutile, anatase and so forth. A consideration is made that anatase titanium oxide is an advantageous material because of further excellent charging/discharging performance and a satisfactory cycle characteristic.

As a known lithium compound advantageous as the material of the lithium-ion secondary battery, lithium titanate is known which is formed into any one of $Li_{2.67}Ti_{1.33}O_4$, $LiTi_2O_4$, $Li_{1.33}Ti_{1.66}O_4$, $Li_{1.44}Ti_{1.71}O_4$, $Li_{0.8}Ti_{2.2}O_4$ and the like. Among the foregoing lithium compounds, $Li_{1.33}Ti_{1.66}O_4$ has attracted attention because of its large charging/discharging capacity.

To obtain lithium titanate, a method has been employed in which a mixture of titanium oxide and a lithium compound is subjected to dry heat treatment at temperatures of 700° C. to 1600° C. (see, Japanese Patent Laid-Open No. 6-275263).

Thus-obtained mission lithium titanate $Li_{1.33}Ti_{1.66}O_4$ has a theoretical charging/discharging capacity of 175 mAh/g in one electronic reaction. However, materials commercially available at present have a charging/discharging capacity of about 130 mAh/g to about 150 mAh/g in 0.75 electronic reaction to 1.0 electronic reaction. That is, the value is excessively smaller than the theoretic capacity (see, Electrochemistry, p.p. 870 to 875, vol. 62, No. 9 (1994)).

In recent years, notebook personal computers, portable CD players, MD players and so forth have widely been used. Therefore, secondary batteries, which are mounted as the power sources of the foregoing apparatuses, are considerably required. Moreover, size reduction causes a requirement for a longer operating time and longer lifetime to arise. Therefore, a material having a large charging/discharging capacity is required considerably.

SUMMARY OF THE INVENTION

An object of the present invention is to provide a non-aqueous electrolyte secondary battery having a charging/discharging capacity larger than that realized by a conventional battery.

Inventors of the present invention have investigated a variety of materials to obtain a material having a satisfactorily large charging/discharging capacity. As a result, of the investigation, the inventors found that hydrogen lithium titanate obtained by substituting protons for lithium ions of lithium titanate has a charging/discharging capacity which is enlarged in proportion to pH (proton substitution quantity x). Moreover, a material having a structure in which voids are formed in the particles enables the charging/discharging capacity to furthermore be enlarged. Thus, the present invention has thus achieved the object of the invention.

That is, a non-aqueous electrolyte secondary battery according to the present invention is characterized by a structure that employs hydrogen lithium titanate, prepared by processing lithium titanate with an acid and having a pH of 11.2 or smaller, as an active material for an electrode. Moreover, in an embodiment hydrogen lithium titanate, which is expressed by a general formula $H_xLi_{y-x}Ti_zO_4$ (where $y \geq x > 0$, $0.8 \leq y \leq 2.7$ and $1.3 \leq z \leq 2.2$), is employed as an active material of an electrode.

Hydrogen lithium titanate according to the present invention can be prepared by processing lithium titanate with an acid. When hydrogen lithium titanate is employed as a material for forming the positive electrode and the negative electrode of a lithium-ion secondary battery. The lithium-ion secondary battery being set to a low potential not higher than 3 V. That is, hydrogen lithium titanate has a capacity that is considerably larger than the theoretical charging/discharging capacity of lithium titanate.

The reason that a material having a capacity considerably larger than the theoretical charging capacity can be prepared by dint of an effect of the proton substitution process will now be described. Basically, lithium titanate has an omission spinel structure. Voids in the omission portions have been charged with doped lithium ions supplied from a lithium source disposed at a counter electrode. Therefore, the capacity is usually not larger than a capacity of 175 mAh/g, which is a theoretical capacity in one electronic reaction. However, lithium titanate subjected to the proton substitution process has a structure where protons are substituted for a portion of lithium which constitutes crystal lattices. Therefore, lithium and protons are exchanged for each other. Thus, voids into which lithium ions can be introduced can be created in crystal lattices of sites A and B which are basically limited voids. As a result of the above-mentioned action, it can be estimated that a material having a charging/discharging capacity which is considerably larger than the theoretical capacity can be obtained.

Additional features and advantages of the present invention are described in, and will be apparent from, the detailed description of the presently preferred embodiments.

DETAILED DESCRIPTION OF THE PRESENTLY PREFERRED EMBODIMENTS

Figure 1:
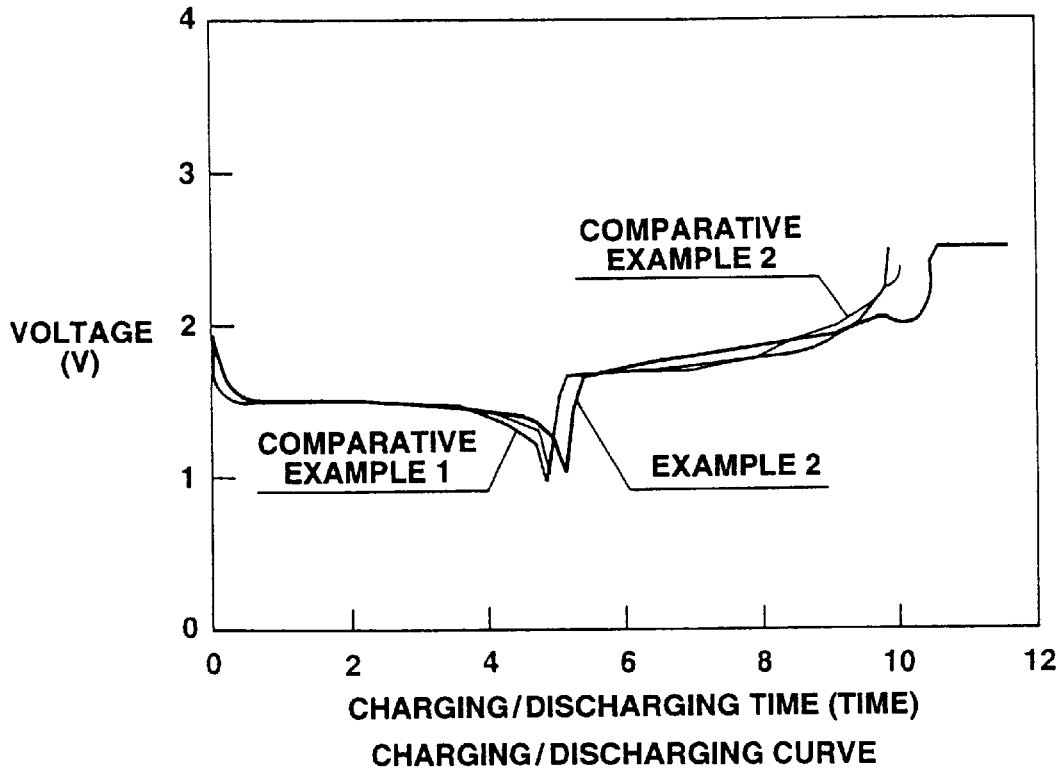
FIG. 1 is a graph showing the characteristic of the difference in charging/discharging curves caused from a fact whether or not an acid process is performed.

The present invention provides a new electrode material for a non-aqueous electrolyte secondary battery. When the electrode material of the present invention is used as the active material in either a positive or negative electrode, the non-aqueous electrolyte secondary battery exhibits a charging/discharging capacity larger than that realized by a conventional battery.

Specifically, the non-aqueous electrolyte secondary battery of the present invention includes a hydrogen lithium titanate compound as an active material. The hydrogen lithium titanate can be prepared by an acid process of lithium titanate. Preferably, the hydrogen lithium titanate has a pH of 11.6 or smaller. In an embodiment, the hydrogen lithium titanate is expressed by the general formula $H_xLi_{y-x}Ti_zO_4$, where $y \geq x > 0$, $0.8 \leq y \leq 2.7$ and $1.3 \leq z \leq 2.2$. When the hydrogen lithium titanate of the present invention is employed as an active material for either a positive or a negative electrode, the inventors have discovered that a charging capacity greater than a theoretical capacity can be achieved.

The pH of lithium titanate realized after an acid process, that is, the pH of obtained hydrogen lithium titanate, can be used as a parameter for adjusting the charging/discharging capacity of hydrogen lithium titanate.

Specifically, it is preferable that the pH of the hydrogen lithium titanate, which can be prepared by the acid process, is smaller than 11.6, more preferably not greater than 11.2.

The pH of hydrogen lithium titanate is measured as follows.

Initially, 30 g of hydrogen lithium titanate is introduced into 50 ml of distilled water, followed by boiling a solution at a temperature of 100° C. for 5 minutes. After the solution has been cooled, water into which hydrogen lithium titanate has been introduced is filtered with filtering paper. The pH of obtained filtrate is measured by a pH meter at temperatures of 20° C. or lower.

When hydrogen lithium titanate has a suitable pH, which is measured as described above and which satisfies the above-mentioned range, significant charging/discharging performance of a battery can be realized. The reason for this lies in that the pH realized after the acid process has been performed is able to serve as one parameter for adjusting the charging/discharging performance, as described above. That is, the proton substitution quantity is enlarged in proportion to the concentration in the acid process. As a result, the pH is shifted to the acid side. If the concentration in the acid process is low, alkaline pH is realized. Thus, the proton substitution quantity is reduced.

When the pH satisfies a certain specific range, hydrogen lithium titanate has a crystal structure advantageous for charging/discharging, that is, a crystal structure having many spaces into which lithium can be introduced.

The range of the pH according to the present invention is estimated to be one of indexes, indicating a fact that the crystal structure advantageous for charging/discharging has been formed. Therefore, use of hydrogen lithium titanate having the above-mentioned pH as the material for forming the negative electrode enables excellent charging/discharging performance to be obtained. In a preferred embodiment, the pH range for hydrogen lithium titanate is 5.6 to 11.2.

The pH has a close relationship with proton substitution of lithium titanate. Therefore, hydrogen lithium titanate according to the present invention is considered to be lithium titanate subjected to proton substitution.

In view of the foregoing, hydrogen lithium titanate according to the present invention is a compound expressed by a general formula $H_xLi_{y-x}Ti_zO_4$. When hydrogen lithium titanate is used, hydrogen lithium titanate in a single phase may be used or a mixture of hydrogen lithium titanate and titanium oxide may be used.

It is preferable that the values of y and z in the above-mentioned general formula are $0.8 \leq y \leq 2.7$ and $1.3 \leq z \leq 2.2$, respectively. It is preferable that the proton substitution quantity x satisfies a range $y \geq x > 0$, more preferably $0.9y \geq x \geq 0.05y$ and most preferably $0.8y \geq x \geq 0.1y$. A material in which protons have been substituted for all of the lithium ions has a composition expressed as y=x, which is included in the scope of hydrogen lithium titanate according to the present invention. If the proton substitution quantity x is smaller than the above-mentioned range, the charging/discharging capacity cannot satisfactorily be enlarged.

It is preferable that hydrogen lithium titanate according to the present invention is formed into particles. In the foregoing case, the shape of the particle is not limited to a specific shape. A variety of shapes including the particle shape and a plate-like shape, may be employed. In particular, hydrogen lithium titanate having voids in the particles thereof is a preferred material because the charging/discharging capacity can furthermore be enlarged.

The existence of the voids can be confirmed by measuring the amount of voids. If the amount of the voids is 0.005 ml/g or greater, existence of voids in the particles can be confirmed. A preferred range for the amount of voids is 0.01 ml/g to 1.5 ml/g, more preferably 0.01 ml/g to 0.7 ml/g. When a laminate structure of particles is employed, a large quantity of voids can be formed in the layers. Hydrogen lithium titanate according to the present invention has a size controlled to be formed into a fine particle shape. Although the largest particle size may arbitrarily be designed, it is preferable that the particle size satisfies a range from 0.05 μm to 50 μm in viewpoints of easiness in use as powder and realizing a satisfactory characteristic of the battery, more preferably a range from 0.05 μm to 10 μm and most preferably a range from 0.1 μm to 1 μm.

It is preferable that the specific surface area satisfies a range from 0.01 m$^2$/g to 300 m$^2$/g, more preferably 0.1 m$^2$/g to 150 m$^2$/g, most preferably 0.5 m$^2$/g to 100 m$^2$/g.

Hydrogen lithium titanate can be prepared by bringing lithium titanate expressed by general formula Li$_y$Ti$_z$O$_4$ (where $0.8 \leq y \leq 2.7$ and $1.3 \leq z \leq 2.2$) into contact with an acid to substitute protons for lithium ions.

Lithium titanate and the acid can be brought into contact with each other by, for example, suspending lithium titanate in a solvent, such as water, alcohol, cellosolve, methylethylketone, xylene or toluene and by then adding the acid. The acid may be an inorganic acid, such as hydrochloric acid, nitric acid or sulfuric acid, or an organic acid, such as acetic acid or formic acid without any limitation. In preferred embodiments acetic acid, hydrochloric acid or acetic acid is employed.

Lithium titanate for use in the manufacturing method according to the present invention is expressed by the general formula Li$_y$Ti$_z$O$_4$. When the values of y and z satisfy $0.8 \leq y \leq 2.7$ and $1.3 \leq z \leq 2.2$, respectively, a preferred composition can be prepared. For example, Li$_{2.67}$Ti$_{1.33}$O$_4$, LiTi$_2$O$_4$, Li$_{1.33}$Ti$_{1.66}$O$_4$, Li$_{1.44}$Ti$_{1.71}$O$_4$, Li$_{0.8}$Ti$_{2.2}$O$_4$ are exemplified. The shape of the particle may be any one of a variety of shapes, including a particle shape and a plate-like shape. The particle shape of lithium titanate causes the particle shape of hydrogen lithium titanate to be formed.

To obtain lithium titanate, a variety of methods can be utilized. For example, a method (1) may be employed with which a mixture of titanium oxide and a lithium compound is subjected to heat treatment at temperatures of 500° C. to 900° C. so as to prepare granular lithium titanate. Another method (2) may be employed that involves three steps. These steps are: a first step in which a titanium compound and an ammonia compound are caused to react with each other in a water-type solvent to obtain a titanate compound; a second step in which the titanate compound and a lithium compound are caused to react with each other in a water-type solvent to obtain lithium titanate hydrate; and a third step in which the lithium titanate hydrate is subjected to heat treatment. Thus, plate-like lithium titanate can be prepared. The foregoing method (1) is a preferred method because lithium titanate can easily be prepared with a low cost. A preferred heat treatment range is 600° C. to 800° C., more preferably 650° C. to 750° C.

The method (2) is a preferred method because the obtained lithium titanate has particles, the size and shape of which are controlled, and enables hydrogen lithium titanate having voids in the particles thereof to be obtained.

In the foregoing method (1), the titanium oxide is any one of a variety of titanium oxides, such as anatase titanium oxide, rutile titanium oxide, amorphous titanium oxide, metatitanic acid or orthotitanic acid, titanate hydroxide, hydrous titanium oxide and hydrate titanium oxide. The lithium compound may be, for example any one of lithium hydroxide, lithium carbonate, lithium nitrate and lithium sulfate. To prepare a mixture of titanium oxide and the lithium compound, any one of the following method may be employed: a methods by which titanium oxide and the lithium compound are simply mixed with each other by a dry method; a method by which the materials are mixed in a water solvent, such as water or water-alcohol, and the mixture is dried; or a method by which the lithium compound is added to slurry of titanium oxide suspended in the water solvent followed by evaporating and extinguishing the material.

The first step of the method (2) is a step for causing the titanium compound and the ammonia compound to react with each other in the water solvent to obtain the titanate compound. The titanate compound is a material having a structure that ammonium ions or the like are substituted for a portion of orthotitanate or protons of orthotitanate. The titanium compound may be an inorganic titanium compound, such as titanium sulfate, titanyl sulfate or titanium chloride, or an organic titanium compound, such as titanium alkoxide. In particular, it is preferable that titanium chloride is employed, which is able to reduce an amount of impurities in hydrogen lithium titanate. The ammonia compound may be ammonia water, ammonium carbonate, ammonium sulfate or ammonium nitrate. If an alkali metal compound, such as a sodium compound or a potassium compound, is employed in place of the ammonia compound, sodium or potassium elements remain in the obtained titanium compound. Thus, calcination among particles takes place when the following heating and dehydration processes are performed. In this case, sintering takes place among particles when a following heating and dehydration process is performed. Thus, sizes and shapes of particles undesirably become nonuniform.

The water solvent may be water or water-alcohol. When the titanium compound and the ammonium compound are mixed with each other in the water solvent, the reaction proceeds. Thus, a titanate compound, which is a compound having a structure in which ammonium ions are substituted for orthotitanate (H$_4$TiO$_4$) or its protons and expressed as H$_{4-n}$(NH$_4$)$_n$TiO$_4$, can be obtained. An amount of substitution of ammonium ion in H$_{4-n}$(NH$_4$)$_n$TiO$_4$ can arbitrarily be changed by adjusting conditions including the concentration of ammonium ions, that of free hydroxyl groups, that of hydrogen ions and reaction temperatures. The particle size of the obtained titanate compound exerts an influence upon the particle size of lithium titanate which will be obtained in a following step. Therefore, the first step is an important step. To prepare the titanate compound in the form of fine particles and to prepare lithium titanate in the form of fine particles, the reaction temperature is set to be 0° C. to 50° C., preferably 5° C. to 40° C., and more preferably 10° C. to 30° C.

The thus-obtained titanate compound is filtered, cleaned with water, cleaned with an acid and dried, as necessary so as to be subjected to the following process in the second step.

The second step is a step in which the titanate compound and the lithium compound obtained in the first step are caused to react in a water solvent so that lithium titanate hydrate is obtained. The lithium compound may be a water-soluble lithium compound, which is exemplified by lithium hydroxide, lithium carbonate, lithium nitrate and lithium sulfate. When the lithium compound and the titanate compound are mixed with each other in a water solvent, the reaction proceeds. The reaction temperature is 50° C. or higher, preferable 100° C. or higher, more preferably 100° C. to 250° C. and most preferably 130° C. to 200° C. When the reaction is performed in the above-mentioned temperature range, lithium titanate hydrate having excellent crystallinity can be obtained.

When the reaction is performed at temperatures not lower than 100° C., it is preferable that the lithium compound and the titanate compound are admitted into an autoclave, followed by subjecting the materials to a hydrothermal process under saturated vapor or under pressure. As a result of the hydrothermal process, lithium titanate hydrate having voids in the particles thereof can be obtained.

The thus-obtained lithium titanate hydrate is filtered, and then cleaned and dried, as necessary. The drying temperature may be an arbitrary level. However, the level must be lower than a temperature at which lithium titanate hydrate discharges crystalline water. It is preferable that the temperature is 30° C. to 200° C.

The third step is a step in which lithium titanate hydrate obtained in the second step is subjected to heat treatment so that lithium titanate expressed by the general formula $Li_y$-$Ti_zO_4$ (where $0.8 \leq y \leq 2.7$ and $1.3 \leq z \leq 2.2$) is obtained. The temperature in the heat treatment must be not lower than the temperature at which lithium titanate hydrate discharges crystalline water. Although the temperature is considered to vary depending on the composition of lithium titanate hydrate and the quantity of crystalline water, the temperature is about 200° C. or higher. It is preferable that the temperature is about 200° C. to about 800° C. to obtain lithium titanate having voids. It is preferable that the temperature is 250° C. to 700° C. to obtain lithium titanate having many voids, more preferably 350° C. to 650° C. to obtain close lithium titanate. The heat treatment must be performed at temperatures not lower than 800° C. If the heat treatment is performed at 1300° C. or higher, lithium titanate in which particles are greatly sintered can be obtained.

The above-mentioned hydrogen lithium titanate may be employed as an active material for a battery. When a counter electrode is made of a material to which lithium can be doped and dedoped, a battery having a large charging/discharging capacity can be manufactured. That is, hydrogen lithium titanate according to the present invention is used as a material for forming a positive electrode and an active material for a negative electrode. Thus, a capacity considerably larger than the theoretical capacity of the active material can be realized. As a result, the charging/discharging capacity of a conventional battery can considerably be enlarged.

In an embodiment, a non-aqueous electrolyte secondary battery is constituted in which hydrogen lithium titanate is employed to form a positive electrode. Moreover, a substance permitting metal lithium, lithium alloy or lithium ions to be doped/dedoped is employed to form a negative electrode. In the foregoing case, the substance permitting lithium ions to be doped/dedoped may be, for example any one of the following materials: thermal decomposition carbon; cokes (pitch cokes, needle cokes, petroleum cokes or the like); graphite; glass carbon; baked organic polymer compound (a material obtained by baking phenol resin, furan resin or the like), carbon fibers and active carbon.

As an alternative embodiment to this, a non-aqueous electrolyte secondary battery is constituted in which hydrogen lithium titanate is employed to form the negative electrode. Moreover, lithium transition metal composite oxide is employed as an active material for the positive electrode. In the foregoing case, the lithium transition metal composite oxide may be, for example any one of $LiCoO_2$, $LiNiO_2$, $LiVO_2$, $LiMn_2O_4$, $Li_{0.5}MnO_2$ or $LiMnO_2$.

By way of example, and not limitation, specific examples of the present invention will now be given such that results of experiments are described. As a matter of course, the present invention is not limited to the foregoing examples.

EXAMPLE 1

Initially, a saturated water solution of LiOH was mixed with anatase type $TiO_2$ (purity 99.8%) in such a manner that a Li atomic ratio $R_{Li/Ti}$ was 1.10. Then, the mixture was pulverized in a mortar. Then, powder obtained by the pulverization process was baked at 800° C. for 8 hours in an oxygen atmosphere so that lithium titanate $Li_{4/3}Ti_{5/3}O_4$ was prepared. Then, the obtained lithium titanate was filtered with a 75-mesh filter, after which the lithium titanate was allowed to pass through the filter and was cleaned with distilled water. Then, lithium titanate was subjected to an acid process using 1.5 wt % acetic acid solution. Then, the lithium titanate subjected to the foregoing process was dried at a temperature of 120° C. for 8 hours so that hydrogen lithium titanate was obtained.

The pH of the obtained hydrogen lithium titanate was measured as follows.

Initially, 30 g of hydrogen lithium titanate was admitted into 50 ml of distilled water, followed by boiling the material at 100° C. for 5 minutes. After the material was cooled, water into which hydrogen lithium titanate was admitted was filtered with filter paper. The pH of the obtained supernatant was measured by a pH meter at a temperature of 20° C. or lower. The pH of the material was 9.2.

EXAMPLE 2 AND EXAMPLE 3

Hydrogen lithium titanate was obtained similarly to Example 1 except for the concentration of acetic acid for use in the acid process. The pH of each of the obtained materials was 8.0 and 5.6, respectively.

COMPARATIVE EXAMPLE 1

A baking process was performed so that lithium titanate was prepared similarly to Example 1. Then, non-processed lithium titanate was employed as a comparative example. The pH of the material was 12.0.

COMPARATIVE EXAMPLE 2

A baking process was performed so that lithium titanate was prepared similarly to Example 1. Then, lithium titanate was cleaned with distilled water. Thus, a material according to a comparative example was obtained similarly to Example 1 except for the acid process using acetic acid being omitted. The pH of the obtained material was 11.6.

The obtained materials were employed to manufacture coin batteries to be evaluated.

Each of the coin batteries to be evaluated was structured such that an outer can, which accommodated negative-electrode pellet and a collector, and an outer cup in which a counter electrode was accommodated, were stacked through a separator. Then, the outer ends of the outer can and the outer cup were caulked through a gasket.

The coin battery to be evaluated was manufactured as follows.

Initially, 90 parts by weight of the material ($Li_{4/3}Ti_{5/3}O_4$) according to each of the examples and the comparative examples, S parts by weight of graphite which served as a conductive material and 5 parts by weight of polyvinylidene fluoride PVdF serving as a binder were added to one another. Then, the material was kneaded and dispersed in a mortar. Then, n-methylpyrolidone in a small quantity was successively added so that a negative electrode mix in the form of slurry was prepared.

The negative electrode mix was dried at a temperature of 120° C. for 2 hours, and then pulverized in a mortar so that powder mix was obtained. The powder mix was charged into an electrode collector in the form of a net made of stainless steel (SUS304), followed by compression-molding the powder mix to have an outer diameter of 15.5 mm and a thickness of 0.2 mm. Then, the molded material was dried in a vacuum at a temperature of 120° C. for 2 hours. Thus, negative electrode pellet was prepared.

Then, metal lithium, which was used to form the counter electrode and which had a thickness of 1.0 mm, was punched by a circular cutter having an outer diameter of 16.5 mm, and then crimped to the outer cup. A sealing gasket made of polypropylene was attached to the outer cup.

The separator in the form of a fine-porous polypropylene film having a predetermined size realized by punching and a thickness of 50 µm was placed on the metal lithium crimped to the outer cup. Then, an electrolyte which was obtained by, at a ratio of 1 mole/l, dissolving $LiPF_6$ in a solvent in which propylene carbonate and methylethyl carbonate were mixed with each other at a volume ratio of 50:50, was dripped from an upper portion. Then, the negative electrode pellet prepared in the previous step was placed on the separator. Then, the outer can was placed on the separator, followed by caulking and closely sealing the outer ends. Thus, the coin battery to be evaluated was manufactured, the coin battery having an outer diameter of 20 mm and a height of 1.6 mm. The outer can was manufactured by nickel-plating a can made of stainless steel (SUS304). A theoretical charging capacity of each of the manufactured batteries was 175 mAh/g.

The batteries were charged with a constant electric current of 1 mA at ambient temperatures to a level of 2.5 V. Then, the batteries were discharged to a level of 1.0 V. The charging capacities in the foregoing charging/discharging process are shown in Table 1. As representative examples, charging/discharging curve of the batteries to be evaluated using hydrogen lithium titanate according to Example 2, Comparative Examples 1 and 2 are shown in FIG. 1.

TABLE 1

| | Process | pH | Charging Capacity (mAh/g) |
|---|---|---|---|
| Example 1 | Process Using Distilled Water + Process Using Acetic Acid | 9.2 | 171 |
| Example 2 | Process Using Distilled Water + Process Using Acetic Acid | 8.0 | 200 |
| Example 3 | Process Using Distilled Water + Process Using Acetic Acid | 5.6 | 271 |
| Comparative Example 1 | No Process | 12.0 | 165 |
| Comparative Example 2 | Only Process Using Distilled Water | 11.6 | 168 |

As can be understood from FIG. 1, the battery according to Example 2 containing hydrogen lithium titanate, which was obtained by subjecting lithium titanate to both the cleaning process and the acid process, enables longer charging/discharging time to be realized as compared with the battery according to Comparative Example 1, which was subjected to no process, and the battery according to Comparative Example 2 which was subjected to only the cleaning process.

As shown in Table 1, the batteries according to Examples 1 to 3 have a charging capacity that is considerably larger than the theoretical value (175 mAh/g).

Thus, definition of the pH of hydrogen lithium titanate can be used as a parameter with which the charging capacity can be estimated.

Figure 2:
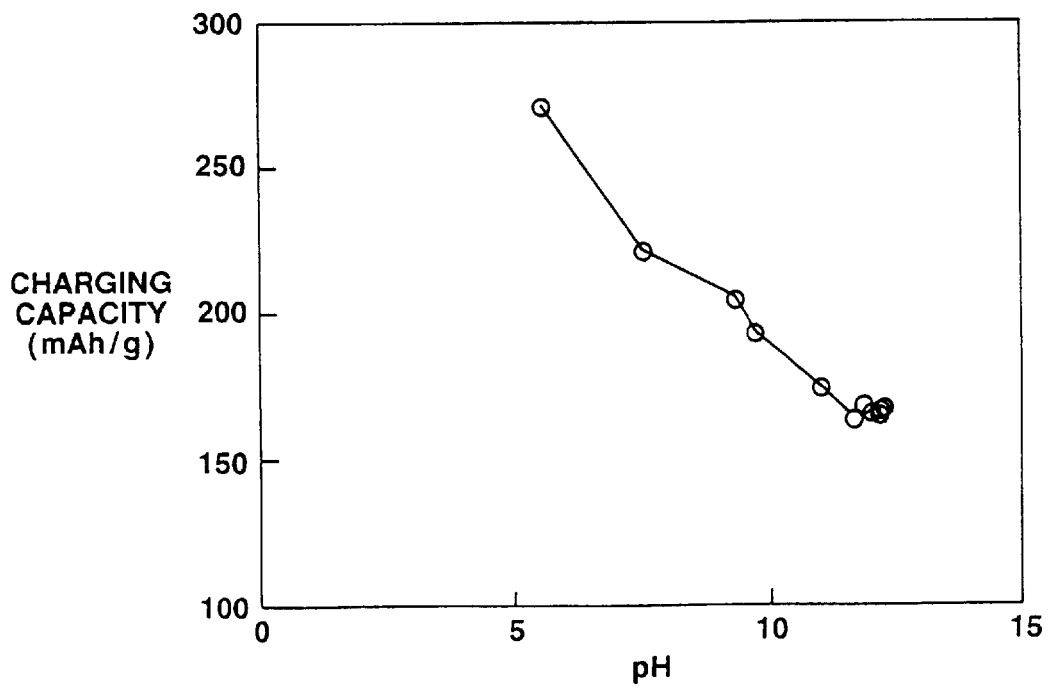
FIG. 2 is a graph showing dependency of the charging capacity of hydrogen lithium titanate on pH.

FIG. 2 shows the relationship between the pH of the lithium titanate (hydrogen lithium titanate) and the charging capacity. A fact can be understood that the charging capacity is rapidly enlarged when the pH is made to be 12.0 or smaller. It is preferable that the pH is 5.6 to 11.2.

The relationship between proton substitution quantity in lithium titanate and improvement in the charging capacity was also investigated. These results will now be given.

EXAMPLE 4

Ammonia water, the concentration of which was 6.01 mole/liter, in a quantity of 8.988 liters was admitted into a 25-liter reaction container made of glass. While the ammonia water was being stirred and the solution was being cooled with ice in such a manner that the temperature of the solution was made to be 10° C. to 20° C., 9.01-liter titanium tetrachloride having a concentration of 1.25 mole/liter was dispersively added for 1.5 hours. The concentration of free ammonia at the moment of time when the addition was completed was 0.5 mole/liter. The concentration of the solid portions was 50 g/liter in $TiO_2$ terms. The pH was 8.3.

After the solution was matured for one hour, hydrochloride solution in a quantity of 1.3 liters and having a concentration of 5 mole/liter was dispersively added for 1 hour so that the pH was made to be 4. Then, the pH was maintained at 4, and the solution was matured for one hour. To maintain the pH at 4 during the maturation, 5 mole/liter hydrochloride solution in a quantity of 0.42 liter was dispersively added. After the maturation process was completed, the solution was filtered and cleaned with water. Thus, titanate compound was obtained.

Pure water was added to the titanate compound obtained as described above, and then the solution was stirred and dispersed by a large-size mixer. Thus, water dispersion solution in a quantity of 17 liters was obtained. The concentration of solid portions in the water dispersion solution was 45.38 g/liter in $TiO_2$ terms. The pH was 6.7. Then, water dispersion solution in a quantity of 13.882 liters and pure water in a quantity of 0.118 liters were admitted into a 25-liter reaction container made of glass. While the solution was being stirred and the solution was being cooled with ice in such a manner that the temperature of the solution was made to be 10° C. to 20° C., 2.01 mole/liter lithium hydroxide solution in a quantity of 4.00 liters was dispersively added for one hour. Then, the solution was matured for one hour. The concentration of the solid portions after the addition process was 35 g/liter in $TiO_2$ terms. The molar ratio Li/Ti was 1.02, and the pH was 11.8.

Matured slurry was admitted into a 25-liter autoclave made of stainless steel. While the slurry was being stirred, the slurry was subjected to a hydrothermal process at a temperature of 190° C. for 4 hours. The viscosity of the slurry subjected to the hydrothermal process was raised to 2140 cp at 25° C.

Then, the slurry subjected to the hydrothermal process was filtered, and then it was not cleaned. The slurry was dried at a temperature of 110° C. so that lithium titanate hydrate ($Li_{1.33}Ti_{1.66}O_4 \cdot H_2O$) was obtained.

Lithium titanate hydrate obtained in the above process was then pulverized, and then the pulverized material was admitted into a baking container made of quartz so as to be baked at 550° C. for 3 hours in the atmosphere. Thus, lithium titanate was obtained.

Pure water in a quantity of 500 ml and 100 g lithium titanate were admitted into a 1-liter reaction container made of glass. While the solution was being stirred, 67 ml of 10 wt % acetic acid solution was collectively added so as to be caused to react at 25° C. for one hour. Then, the solution was filtered and cleaned, and then the solution was dried in the atmosphere at a temperature of 110° C. for 3 hours. Thus, hydrogen lithium titanate was obtained.

Figure 3:
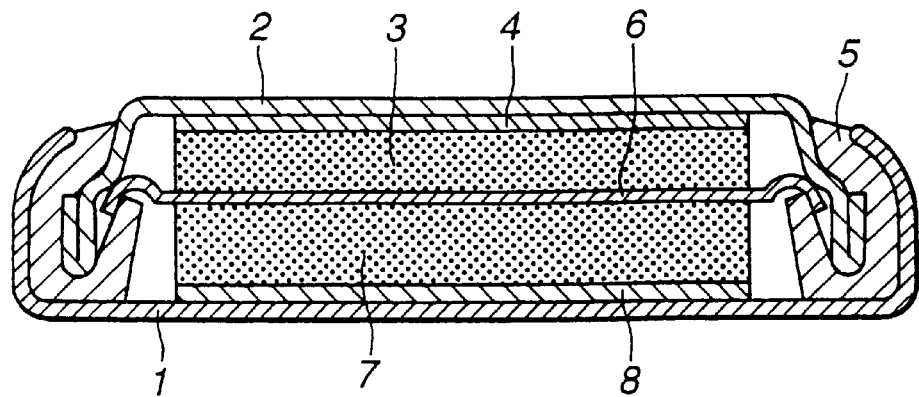
FIG. 3 is a schematic cross sectional view showing the structure of a coin-type non-aqueous electrolyte secondary battery.

The obtained hydrogen lithium titanate was employed as the active material for the positive electrode to manufacture a coin-type non-aqueous electrolyte secondary battery. The detailed structure of the battery will now be described with reference to FIG. 3.

Initially, 5 parts by weight of graphite serving as a conductive material, and 5 parts by weight of polyvinylidene fluoride, serving as a binder, were added to 90 parts by weight of hydrogen lithium titanate, serving as the active material. The mixture was kneaded and dispersed in a mortar. Then, NMP in a small quantity was successively added so that a mix in the form of slurry was prepared. The mix was dried at a temperature of 120° C. for 2 hours, and then pulverized in a mortar so that dry powder mix was obtained. The powder mix was charged into an electrode collector 8 in the form of a net made of stainless steel (SUS304), followed by compression-molding the powder mix to have an outer diameter of 15 mm and a thickness of 0.2 mm so that pellet 7 was manufactured. The pellet 7 was dried in a vacuum at 120° C. for 2 hours.

Then, metal lithium 3, which was used to form a counter electrode and which had a thickness of 1.0 mm, was punched by a circular cutter having an outer diameter of 16 mm, and then crimped to a cup 2. A separator 6 in the form of a fine-porous polypropylene film, having a predetermined size realized by punching and a thickness of 25 μm, was placed on the metal lithium 3. The separator 6 was thus inserted into a structure in which a polypropylene sealing gasket 5 was attached to the cup 2. Then, an electrolyte obtained by, at a ratio of 1 mole/l, dissolving $LiPF_6$ in a solvent in which propylene carbonate (PC), ethylene carbonate (EC) and 1, 2 dimethoxyethane (DME) were mixed in the same quantities. The electrolyte was dripped.

Then, the pellet 7 was placed, and then a can 1 composed of two layers and manufactured by nickel-plating stainless steel (SUS304) was placed to cover the structure. The sealing opening was caulked so as to be sealed. Thus, a coin type non-aqueous electrolyte secondary battery having an outer diameter of 20 mm and a height of 1.6 mm was manufactured.

EXAMPLE 5

A process similar to that according to Example 1 was performed except for a condition according to Example 4 for manufacturing lithium titanate before proton substitution was performed. That is, 40 wt % acetic acid solution in a quantity of 167 ml was collectively added, and the solution was caused to react at 60° C. for one hour. This process was performed in place of the process in which baking was performed at 550° C. for 3 hours, 67 ml of 10 wt % acetic acid solution was collectively added to the obtained lithium titanate and reaction was performed at 25° C. for one hour. Thus, hydrogen lithium titanate was obtained.

Obtained hydrogen lithium titanate was employed so that a coin-type non-aqueous electrolyte secondary battery was manufactured similarly to Example 4.

EXAMPLE 6

A process similar to that according to Example 4 for manufacturing lithium titanate before proton substitution was performed. That is, 5 mole/liter hydrochloric acid solution in a quantity of 200 ml was dispersively added for one hour and the solution was caused to react at 60° C. for one hour. This process was performed in place of the process in which baking was performed at 550° C. for 3 hours, 67 ml of 10 wt % acetic acid solution was collectively added and the solution was caused to react at the temperature of 25° C. for one hour. Thus, hydrogen lithium titanate was obtained.

Obtained hydrogen lithium titanate was employed so that a coin-type non-aqueous electrolyte secondary battery was manufactured similarly to Example 4.

COMPARATIVE EXAMPLE 3

Lithium titanate ($Li_{1.44}Ti_{1.65}O_4$) was employed in place of hydrogen lithium titanate so that a coin-type non-aqueous electrolyte secondary battery was manufactured similarly to Example 4.

Evaluation of Characteristics

The chemical compositions Li and Ti of samples according to Examples 4 to 6 and Comparative Example 3, respectively, were detected by chemical analysis. The largest particle size was read by electron micrograph. The specific surface area and an amount of voids were measured by using BELLSOAP 28 manufactured by Nihon Bell. The H (proton) substitution quantity was obtained by TG-DTA thermal analysis as follows: in a TG-DTA curve, reduction in a quantity caused from an endothermic reaction occurring by dint of removal of protons as water was observed at positions adjacent to 213° C. and 277° C. to correspond to protons of sites B and A of the spinel structure. The foregoing reduction in quantity was used to calculate the proton substitution quantity. The proton substitution quantity calculated by the above-mentioned method accurately corresponds to the residue of Li previously detected by the chemical analysis.

The charging capacities of Examples 4 to 6 and Comparative Example 3 were measured. Results are shown in Table 2.

TABLE 2

|  |  | Proton Substitution Quantity % | Largest Particle Sizes μm | Specific Surface Areas m²/g | Amounts of Voids ml/g | Charging Capacities mAh/g |
|---|---|---|---|---|---|---|
| Example 4 | $H_{0.16}Li_{1.14}Ti_{1.67}O_4$ | 12 | 0.1–0.2 | 29 | 0.20 | 171 |
| Example 5 | $H_{0.54}Li_{0.80}Ti_{1.67}O_4$ | 40 | 0.1–0.2 | 53 | 0.46 | 215 |

TABLE 2-continued

|  |  | Proton Substitution Quantity % | Largest Particle Sizes μm | Specific Surface Areas m$^2$/g | Amounts of Voids ml/g | Charging Capacities mAh/g |
|---|---|---|---|---|---|---|
| Example 6 | H$_{1.28}$Li$_{0.02}$Ti$_{1.67}$O$_4$ | 99 | 0.1–0.2 | 62 | 0.43 | 270 |
| Comparative Example 3 | Li$_{1.44}$Ti$_{1.65}$O$_4$ | 0 | 0.2–0.4 | 6 | 0.03 | 145 |

These results confirmed that the charging capacity of the active material was enlarged in proportion to the proton substitution quantity in lithium titanate. Additionally, the results confirmed that the enlargement of the charging capacity was caused from correlation of protons obtained by DSC with an amount of enlargement of the quantity of voids and the specific surface area. As a result, the results demonstrate a fact was confirmed that the charging capacity of the hydrogen lithium titanate was considerably enlarged pursuant to the present invention.

EXAMPLE 7

Hydrogen lithium titanate prepared similarly to Example 4 was employed as a material for the negative electrode. Moreover, LiCoO$_2$ was employed as a material for the positive electrode. Thus, a coin-type non-aqueous electrolyte secondary battery having a structure similar to that shown in FIG. 3 was manufactured.

That is, 1-mole of guaranteed reagent cobalt oxide (III) and 0.5 mole of guaranteed reagent lithium carbonate were mixed with each other, followed by baking the mixture in air at 900° C. for 5 hours. LiCoO$_2$ was thereby obtained.

Then, 6 parts by weight of graphite powder, which was a conductive material, and 3 parts by weight of polytetrafluoroethylene powder were added to 91 parts by weight of LiCoO$_2$, which was the active material for the positive electrode. Then, the mixture was uniformly mixed to prepare an active material for the positive electrode.

The material for the positive electrode in a mass of 500 mg was charged, followed by performing a previous molding process. Then, an aluminum net, which was the collector 8, was placed, followed by performing pressure molding. Thus, pellet 7 for the positive electrode was manufactured, the pellet having an outer diameter of 15.5 mm and a height of 0.7 mm.

Hydrogen lithium titanate, which was the negative electrode 3, was injected into an electrode cup 2. A separator 6 in the form of a fine-porous polypropylene film having a predetermined size realized by punching and a thickness of 25 μm was placed on the negative electrode 3 such that the separator 6 was inserted into a structure in which a polypropylene sealing gasket 5 was attached to the cup 2. Then, an electrolyte obtained by, at a ratio of 1 mole/l, dissolving LiPF$_6$ in a solvent in which propylene carbonate (PC), ethylene carbonate (EC) and 1, 2 dimethoxyethane (DME) were mixed in the same quantities. The electrolyte was dripped.

Then, the pellet 7 was placed, and then a can 1 composed of two layers and manufactured by nickel-plating stainless steel (SUS304) was placed to cover the structure. The sealing opening was caulked so as to be sealed. Thus, a coin type non-aqueous electrolyte secondary battery having an outer. diameter of 20 mm and a height of 1.6 mm was manufactured.

EXAMPLE 8

Hydrogen lithium titanate similar to that according to Example 5 was employed so that a coin-type non-aqueous electrolyte secondary battery was manufactured similarly to Example 7.

EXAMPLE 9

Hydrogen lithium titanate similar to that according to Example 6 was employed so that a coin-type non-aqueous electrolyte secondary battery was manufactured similarly to Example 7.

COMPARATIVE EXAMPLE 4

Lithium titanate similar to that according to Comparative Example 3 was employed so that a coin-type non-aqueous electrolyte secondary battery was manufactured similarly to Example 7.

Evaluation of Characteristics

Figure 4:
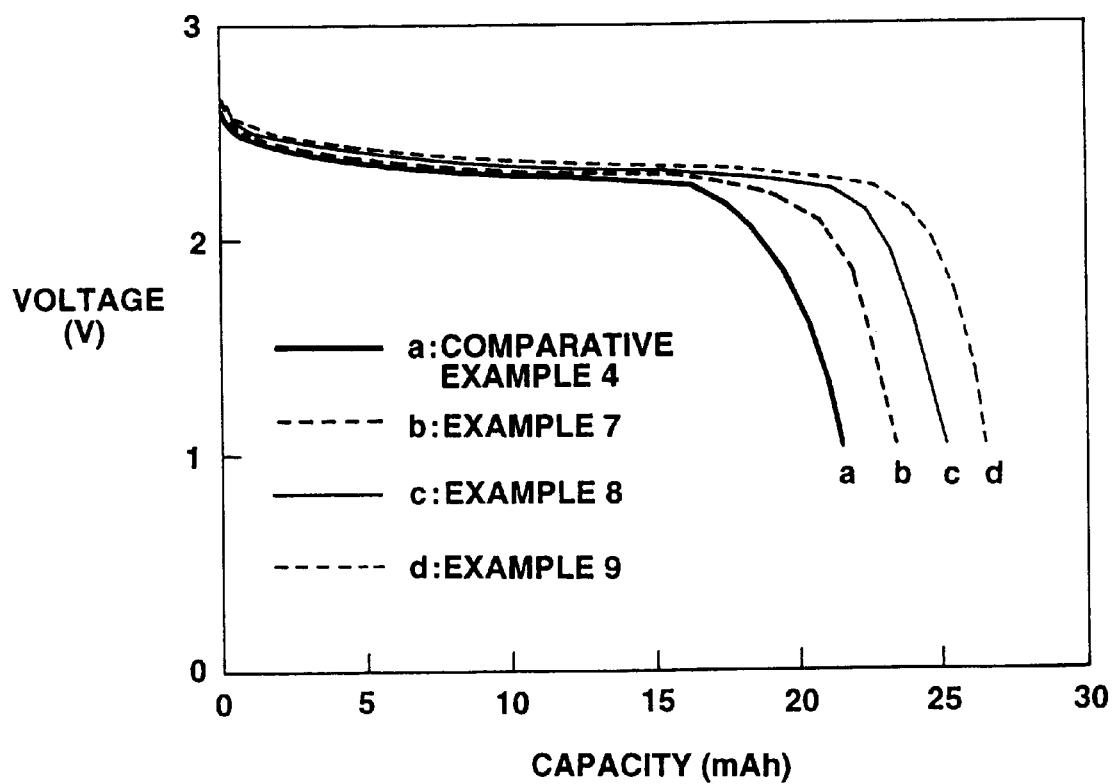
FIG. 4 is a graph showing a discharge curve of a battery containing hydrogen lithium titanate for forming an active material of a negative electrode.

The thus-manufactured coin-type batteries were charged to 2.5 V with a constant electric current of 1 mA at ambient temperatures, following by discharging the battery to 1.0 V. Thus, the charging/discharging capacities were measured. Results are shown in Table 3. Moreover, a discharging curve of the battery is shown in FIG. 4. The measurement was performed under conditions that charging was performed to 2.65 V with 1 mA, final voltage was 1.0 V and discharging was performed with 1 mA at 23° C.

TABLE 3

|  | Capacity of Negative Electrode mAh/g | Capacity of Battery mAh/g | Capacity Enlargement Ratio % |
|---|---|---|---|
| Example 7 | 23.4 | 18.7 | 8.9 |
| Example 8 | 25.1 | 20.1 | 16.9 |
| Example 9 | 26.7 | 21.4 | 24.2 |
| Comparative Example 4 | 21.5 | 17.2 | — |

In a case of comparative example 4, the capacity was reduced by 20% because the actual capacity of the battery was 17.2 mAh with respect to a capacity of the negative electrode of 21.5 mAh.

Although the battery was designed to be administrated by the negative electrode, the voltage was raised to the final voltage of 3.0 V owning to change in the voltage at the positive electrode before the voltage reached the designed capacity of the negative electrode. Also, Examples 7 to 9 resulted in a battery capacity of 80% of the capacity of the negative electrode.

When the batteries according to the comparative examples and those according to the examples were subjected to comparisons, Comparative Example 4, containing lithium titanate prepared by the conventional method, had a capacity of 17.2 mAh. The capacity of Example 7, containing hydrogen lithium titanate, had a capacity of 18.7 mAh which was about 9%. The capacity of Example 8 was 20.1 mAh which was about 17%. The capacity of Example 9 was 21.4 mAh which was about 24%. As described above, the capacities were enlarged.

The foregoing enlargement was caused from use of hydrogen lithium titanate as the material for the negative electrode.

It is understood that certain modifications and changes to the preferred embodiments described herein will be apparent to those skilled in the art. Such changes and modifications can be made without departing from the spirit and scope of the present invention and without diminishing its intended advantages. Therefore, the appended claims are intended to cover such changes and modifications.

We claim:

1. A non-aqueous electrolyte secondary battery comprising: hydrogen lithium titanate obtained by an acid process of lithium titanate and having pH of 11.2 or smaller, wherein the hydrogen lithium titanate is employed as an active material for an electrode.

2. A non-aqueous electrolyte secondary battery: comprising hydrogen lithium titanate expressed by general formula $H_xLi_{y-x}Ti_zO_4$ (where $y \geq x > 0$, $0.8 \leq y \leq 2.7$ and $1.3 \leq z \leq 2.2$), wherein the hydrogen lithium titanate is employed as an active material for the electrode.

3. A non-aqueous electrolyte secondary battery according to claim 2, wherein the hydrogen lithium titanate is formed into particles and structured to have voids in the particles.

4. A non-aqueous electrolyte secondary battery according to claim 3, wherein a largest particle size of hydrogen lithium titanate in the form of particles is 0.1 μm to 50 μm.

5. A non-aqueous electrolyte secondary battery according to claim 3, wherein the specific surface area of the hydrogen lithium titanate in the form of particles is 0.01 m$^2$/g to 300 m$^2$/g.

6. A non-aqueous electrolyte secondary battery according to claim 1, wherein hydrogen lithium titanate is employed in a positive electrode and a material obtained by doping/dedoping metal lithium, lithium alloy or lithium ions is employed in a negative electrode.

7. A non-aqueous electrolyte secondary battery according to claim 1, wherein hydrogen lithium titanate is employed in a negative electrode and lithium transition metal composite oxide is employed in a positive electrode.

8. A non-aqueous electrolyte secondary battery of claim 2, wherein the hydrogen lithium titanate is employed in a positive electrode and a material that permits the doping/dedoping of metal lithium, lithium alloy or lithium ions is employed in a negative electrode.

9. A non-aqueous electrolyte secondary battery of claim 2, wherein the hydrogen lithium titanate is employed in a negative electrode and a lithium transition metal composite oxide is employed in a positive electrode.

10. A non-aqueous electrolyte secondary battery comprising:

an electrode, the electrode containing a hydrogen lithium titanate compound as an active material.

11. The non-aqueous electrolyte secondary battery of claim 10 wherein, the hydrogen lithium titanate has a pH of less than 11.6.

12. The non-aqueous electrolyte secondary battery of claim 10 wherein the hydrogen lithium titanate is obtained by an acid process of lithium titanate.

13. The non-aqueous electrolyte secondary battery of claim 10 wherein the hydrogen lithium titanate is expressed by a general formula $H_xLi_{y-x}Ti_zO_4$, wherein $y \geq x > 0$, $0.8 \leq y \leq 2.7$ and $1.3 \leq z \leq 2.2$.

14. The non-aqueous electrolyte secondary battery of claim 10 wherein the electrode is a positive electrode and the secondary battery further comprises:

a negative electrode opposite to the positive electrode; and a separator separating the positive and negative electrodes.

15. The non-aqueous electrolyte secondary battery of claim 14 wherein the negative electrode contains a material that permits metal lithium, lithium alloy or lithium ions to be doped/dedoped.

16. The non-aqueous electrolyte secondary battery of claim 15 wherein the material is selected from the group consisting of: thermal decomposition carbon; cokes; graphite; glass carbon; baked organic polymer compound; carbon fibers and active carbon.

17. The non-aqueous electrolyte secondary battery of claim 10 wherein wherein the hydrogen lithium titanate is formed into particles and structured to have voids in the particles.

18. The non-aqueous electrolyte secondary battery of claim 10 wherein a largest particle size of the hydrogen lithium titanate in the form of particles ranges from 0.1 μm to 50 μm.

19. The non-aqueous electrolyte secondary battery of claim 10 wherein the specific surface area of the hydrogen lithium titanate in the form of particles ranges from 0.01 m$^2$/g to 300 m$^2$/g.

20. The non-aqueous electrolyte secondary battery of claim 10 wherein the electrode is a negative electrode and the secondary battery further comprises:

a positive electrode opposite to the negative electrode; and a separator separating the positive and negative electrodes.

21. The non-aqueous electrolyte secondary battery of claim 20 wherein the positive electrode is a lithium transition metal composite oxide.

22. The non-aqueous electrolyte secondary battery of claim 21 wherein the lithium transition metal composite oxide is selected from the group consisting of: $LiCoO_2$, $LiNiO_2$, $LiVO_2$, $LiMn_2O_4$, $Li_{0.5}MnO_2$ or $LiMnO_2$.

23. An electrode material for a non-aqueous electrolyte secondary battery, the electrode material comprising:

a hydrogen lithium titanate compound as an active material.

24. The electrode material of claim 23 wherein the hydrogen lithium titanate has a pH of less than 11.6.

25. The electrode material of claim 23 wherein the hydrogen lithium titanate is obtained by an acid process of lithium titanate.

26. The electrode material of claim 23 wherein the hydrogen lithium titanate is expressed by a general formula $H_xLi_{y-x}Ti_zO_4$, wherein $y \geq x > 0$, $0.8 \leq y \leq 2.7$ and $1.3 \leq z \leq 2.2$.

27. The electrode material of claim 23 wherein the material is the active material for a positive electrode or a negative electrode.

28. The electrode material of claim 23 wherein the hydrogen lithium titanate is formed into particles and structured to have voids in the particles.

29. The electrode material of claim 23 wherein a largest particle size of the hydrogen lithium titanate in the form of particles ranges from 0.1 μm to 50 μm.

30. The electrode material of claim 23 wherein the specific surface area of the hydrogen lithium titanate in the form of particles ranges from 0.01 m$^2$/g to 300 m$^2$/g.

* * * * *